(12) United States Patent
Gamare et al.

(10) Patent No.: US 10,839,326 B2
(45) Date of Patent: Nov. 17, 2020

(54) MANAGING PROJECT STATUS USING BUSINESS INTELLIGENCE AND PREDICTIVE ANALYTICS

(71) Applicant: Dell Products L.P., Round Rock, TX (US)

(72) Inventors: Kalyani Sandeep Gamare, Cedar Park, TX (US); Rodney Karl D'Souza, Austin, TX (US); Cory D. Pate, Pflugerville, TX (US); Travis E. Taylor, III, Hutto, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 183 days.

(21) Appl. No.: 15/296,882

(22) Filed: Oct. 18, 2016

(65) Prior Publication Data

US 2018/0107959 A1    Apr. 19, 2018

(51) Int. Cl.
*G06Q 10/06* (2012.01)
*G06N 20/00* (2019.01)
*G06N 5/04* (2006.01)

(52) U.S. Cl.
CPC ....... *G06Q 10/06313* (2013.01); *G06N 5/046* (2013.01); *G06N 20/00* (2019.01)

(58) Field of Classification Search
CPC ............................... G06Q 10/00; G06Q 40/00
USPC ...................................................... 705/7.23
See application file for complete search history.

(56) References Cited

U.S. PATENT DOCUMENTS

| | | | |
|---|---|---|---|
| 6,427,132 B1* | 7/2002 | Bowman-Amuah | ........................ G06Q 30/02 703/22 |
| 6,826,538 B1* | 11/2004 | Kalyan | ................... G06Q 10/06 705/7.25 |
| 7,338,639 B2* | 3/2008 | Burke | ................ G01N 27/3274 422/401 |
| 7,480,640 B1* | 1/2009 | Elad | ....................... G06Q 10/10 706/14 |
| 7,931,197 B2* | 4/2011 | Brandt | ................... G06Q 10/08 235/380 |
| 2003/0150908 A1* | 8/2003 | Pokorny | ................ B23Q 35/12 235/375 |
| 2007/0179829 A1* | 8/2007 | Laperi | .................... G06Q 10/06 705/7.16 |

(Continued)

OTHER PUBLICATIONS

JIRA, JIRA User's Guide, 2002-2005, JIRA, http://www.atlassian.com/software/jira/docs/v3.13/jira-manual-user.pdf, (Year: 2005).*

(Continued)

*Primary Examiner* — Romain Jeanty
(74) *Attorney, Agent, or Firm* — Jackson Walker LLP; Christopher J. Rourk

(57) ABSTRACT

A method for project status management is provided that includes creating an issue identification data structure in a non-transitory memory device using a processor. Generating a notification to an analyst using the processor to process the issue identification data structure. Creating one or more sub-component dependencies in the issue identification data structure using the processor. Receiving issue resolution data associated with the issue identification data structure at the processor. Creating a new business intelligence rule using the processor. Associating the new business intelligence rule with the issue identification data structure using the processor.

19 Claims, 2 Drawing Sheets

(56) References Cited

U.S. PATENT DOCUMENTS

| | | | | |
|---|---|---|---|---|
| 2007/0294603 A1* | 12/2007 | Kaleja | ................... | G06F 11/324 |
| | | | | 714/57 |
| 2008/0222456 A1* | 9/2008 | Jones | ................. | G06F 11/0709 |
| | | | | 714/45 |
| 2008/0313596 A1* | 12/2008 | Kreamer | ................ | G06Q 10/06 |
| | | | | 717/101 |
| 2009/0254535 A1* | 10/2009 | Eickelmann | .......... | G06F 16/951 |
| 2011/0119100 A1* | 5/2011 | Ruhl | ...................... | G06Q 10/06 |
| | | | | 705/7.11 |
| 2013/0046764 A1* | 2/2013 | Choi | ...................... | G06Q 10/06 |
| | | | | 707/740 |
| 2014/0236649 A1* | 8/2014 | Hamid | ................. | G06Q 10/103 |
| | | | | 705/7.11 |
| 2015/0235143 A1* | 8/2015 | Eder | ....................... | G06F 19/00 |
| | | | | 706/12 |
| 2017/0053289 A1* | 2/2017 | Wang | ................. | G05B 23/0278 |
| 2017/0232515 A1* | 8/2017 | DeMuth | ................. | B33Y 10/00 |
| | | | | 419/53 |
| 2018/0004848 A1* | 1/2018 | Zeng | ................... | G06F 16/9535 |

OTHER PUBLICATIONS

JIRA, JIRA Documentation, 2002-2005, JIRA, http://www.usit.uio.no/prosjekter/gorilla/doku/jira-manual.pdf, p. 1-376 (Year: 2005).*

* cited by examiner

US 10,839,326 B2

MANAGING PROJECT STATUS USING BUSINESS INTELLIGENCE AND PREDICTIVE ANALYTICS

TECHNICAL FIELD

The present disclosure relates generally to project status management, and more specifically to managing project status using business intelligence and predictive analytics.

BACKGROUND OF THE INVENTION

Project management software is used to monitor the status of project tasks and resources that will be assigned to those tasks. While software tools for project management exist, they might do little more than report the current status of tasks, and provide no business intelligence or predictive analytics.

SUMMARY OF THE INVENTION

A method for project status management is provided that includes creating an issue identification data structure in a non-transitory memory device using a processor, such as in response to a user identification of the issue using a user interface to a software project management system operating on a server. A notification to an analyst is generated using the server to process the issue identification data structure. Sub-component dependencies are then created in the issue identification data structure using the server. After issue resolution data associated with the issue identification data structure is received at the server, a new business intelligence rule is created using the server. The new business intelligence rule is associated with the issue identification data structure using the server.

Systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
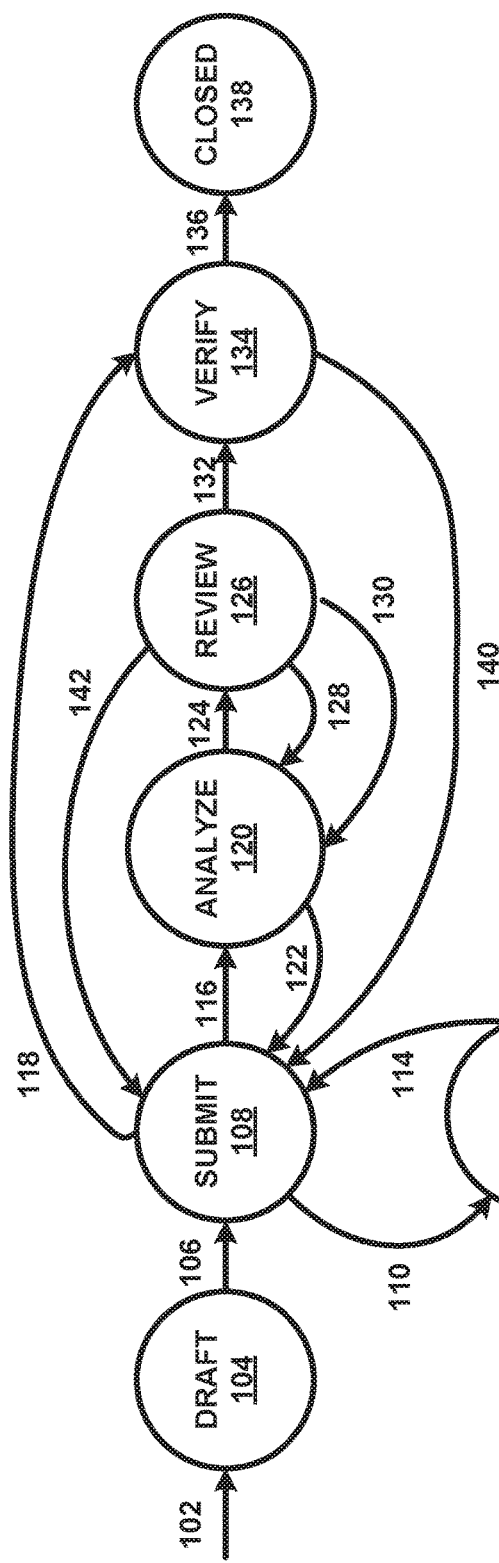
FIG. 1 is a diagram of a system for creating business intelligence and predictive analytics, in accordance with an exemplary embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

In the manufacturing business, such as computer server manufacturing, a large number of defects and other manufacturing issues may need to be tracked to resolution over time. Typically, there will be a limited number of resources such as engineers, scientists and other personnel, who can be assigned to resolve identified defects and attend to other manufacturing issues. It is useful to have a comprehensive suite of reporting capabilities to provide business intelligence for defect, manufacturing issue and other item resolution across multiple teams and for each deadline.

For example, products such as servers usually need to ship by a specific date, and the product design and manufacturing organization management needs continuous insight on where to allocate resources so as to meet those deadlines, in order to maintain a competitive advantage against other manufacturers.

Software tools such as Agile Product Quality Management do not have flexible reporting functions. In contrast, JIRA software from Atlassian of Sydney, Australia can be used to provide real-time reporting capabilities, and supports the use of plugins, such as the Dataplane plugin for 'self-service' reporting using templates, and the eazyBI plugin for specialized Business Intelligence. JIRA also provides simplified customized coding to compute specialized metrics.

Manufacturer's standard reports that have been used with older and/or legacy systems can be readily implemented in JIRA using custom coding to provide real time charts. There are a number of areas where JIRA can be used to improve business intelligence and predictive analytics over the prior art.

For example, issue state transitions in the prior art do not clearly indicate required fields for that state to change, and reflect only when a user tries to change state, which is frustrating to users. A failing verification of an issue does not require the user to enter a reason for the failure, which makes it impossible to track reasons for failure. In addition, there is no clear association between the issue manager, the functional organization that is responsible for the issue, and the component (affected item) of the issue. Another example is that there is no linkage to test cases or requirements.

The JIRA Defects Management workflow allows research and development teams and other personnel to track and manage the defects through a product lifecycle. The JIRA workflow stores history of all actions performed. In addition, the JIRA workflow indicates all mandatory fields with an asterisk that is displayed before the state is changed. There is also a clear association between the issue manager, the functional organization and the component fields. End to end traceability of features, test cases and defects is also provided, with 1) real time charts and reporting with JIRA, 2) custom filters, reports and gadgets for individual or a project, 3) dashboards with easy reporting access for various teams, 4) automated notifications to users, 5) vendors/original design manufacturer (ODM)/suppliers that are part of issue management, and 6) information that can be shared with vendors.

However, proprietary and competitive conflicts still exist. In order to protect intellectual property from being exposed to vendors, the 'default' setting is for defects not to be exposed to vendors. Likewise, sharing of vendor defect information with other vendors is prohibited, so that vendors can only see issues assigned to that specific vendor, but manufacturing entity employees can see all issues.

For issue-level security, issue security levels are provided to allow a user to control who can see individual issues within a project. Issues can then utilize the levels to apply fine grain control on who has visibility to an issue. Customized coding can be used to dynamically adjust the security depending on user actions. Active Directory groups can also be used to distinguish different classes of users and allow them specific access to data. Custom fields can be used based on vendor selection, such as an "Originating Vendor," field, a "Vendor Access" field and other suitable fields. Other useful features include 1) back-end custom Groovy coding using ScriptRunner plugins, 2) additional information regarding year-long metrics efforts, 3) pre-built dashboards for tracking progress, 4) standardized reports covering intricate metrics of server defect management, 5) use of plug-in vendors to alpha-test undocumented scripts and features for customization, 6) real-time reports, 7) post-project analysis reports, 8) trending reports e.g. "chopsticks", group charts, solutions views and platform views, and 9) subscriptions and alerts for quicker management of defects.

In one exemplary embodiment, the present disclosure provides real-time reporting capabilities for manufacturing organizations across multiple complex system subdivisions, to allow defects, manufacturing issues and other product-related information to be compiled and analyzed to identify areas where resources need to be allocated. For example, a product can be broken down into a predetermined number of different sub-components, and the number of defects or other manufacturing issues that are identified for each sub-component can be tracked. In this manner, the relationship between problems in different sub-components can be determined, and used to predict the resources that will be necessary to correct the defects or issues.

In another exemplary embodiment for a computer product, if a fan defect is identified that will result in fan failure rates that are greater than design levels, those fan failure rates will cause overheating of CPUs and failures rates for CPUs that are greater than design levels. These CPU failure rates will not require additional resources in the CPU component design area, because they are directly related to the fan defect. The present disclosure allows these dependencies to be identified and used to allocate resources to resolve the problem most effectively, such as by increasing resources for correction of the fan defect and not by increasing resources for correction of a CPU failure rate.

FIG. 1 is a diagram of a system 100 for creating business intelligence and predictive analytics, in accordance with an exemplary embodiment of the present disclosure. System 100 includes a draft stage 104, a submit stage 108, a clarify stage 112, an analyze stage 120, a review stage 126, a verify stage 134 and a closed stage 138, each of which reflect a state of electronic data processing systems that can be implemented in hardware or a suitable combination of hardware and software.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

Draft stage 104 is initiated after an original issue creation process 102, which can be implemented through a user interface and which can include identification of a predetermined number of fields of data. In one exemplary embodiment, a user interface can include pull-down menus and fill-in fields that allow a user to select a component organization, a component, a problem, or other user-selectable data, and which also allows the user to provide additional data regarding a defect, a manufacturing issue, or other suitable data. The original issue creation process 102 uses an existing business intelligence and predictive analytics state that reflects the previous processing of data pertaining to a manufactured item, a system or other suitable logical entities. As such, system 100 can be used to modify any prior art logical entity to accommodate business intelligence and predictive analysis for resolution of defects, issues or for other suitable purposes.

After it has been determined that a minimum required data set of information has been provided, a submission process 106 is enabled to allow the process to proceed to a submit stage 108, at which the issue is reviewed by one or more reviewers to determine whether it is complete and whether sufficient data exists for the issue to be assigned to an analyst. If any problems are identified with the issue definition by a reviewer, the reviewer can invoke a clarification request process 110 to change the state of the issue to clarify stage 112. In clarify stage 112, the original user or any suitable other user can provide additional data that may be needed to allow the issue to be submitted to analyze stage 120. The issue is then submitted to submit stage 108 through submit process 114, and the issue is reviewed again to determine whether it can be provided to analyze stage 120.

Once the issue has been forwarded by analyze process 116 to analyze stage 120, an analyst user is assigned to the issue to determine whether existing business intelligence and predictive analysis can be applied to the issue. In one exemplary embodiment, a newly identified issue can be determined to be the same as or functionally similar to a known issue, such as by comparing the issue to a library of existing business intelligence and predictive analysis data. If the analyst determines that additional information is needed to analyze the issue, the analyst can invoke a return assignment process 122 to return the issue to submit stage 108. Otherwise, the analyst creates a proposed disposition by using existing product sub-components, existing sub-component dependencies, existing linear regression analyses or other suitable data, by creating new product sub-components, new sub-component dependencies, by identifying new or required linear regression analyses, or by creating other suitable data structures, and by invoking process 124 to move the issue to a review stage 126.

In the review stage 126, one or more reviewers can review a proposed disposition (use existing product sub-components, existing sub-component dependencies, existing linear regression analyses or other suitable data, creating new product sub-components, new sub-component dependencies, identifying new or required linear regression analyses) and can provide additional data to the reviewer by invoking a deferral rejection process 128 (such as by rejecting the proposed creation of new product sub-components, new sub-component dependencies, new linear regression analyses), by invoking a failed disposition process 130 (such as by obtaining or providing data reflecting the failure of the proposed business intelligence rule modification or predictive analysis), by invoking a deferral approval process 142 (such as when obtaining data for creation of new product sub-components, new sub-component dependencies, or performing additional linear regression analyses would require deferral of the issue) or by invoking process 132 to move the issue to a verify stage 134. At verify stage 134, one or more users can invoke a failed verification process 140 to return the issue to submit stage 108 for resubmission by process 118, or can invoke process 136 to advance the issue to close stage 138.

In operation, system 100 allows an organization to process issues to create business intelligence and to perform predictive analysis. For example, system 100 can be used for manufacturing complex systems such as servers and computers, which have multiple different design organizations and component dependencies, and which use existing business intelligence rules and predictive analytical techniques to identify and resolve issues. System 100 can analyze new issues to determine whether they are encompassed by the existing business intelligence rules and predictive analyses, or if new business intelligence rules or predictive analysis are required to address the issue, and allows the status of the issue to be tracked while such additional information is being generated.

Figure 2:
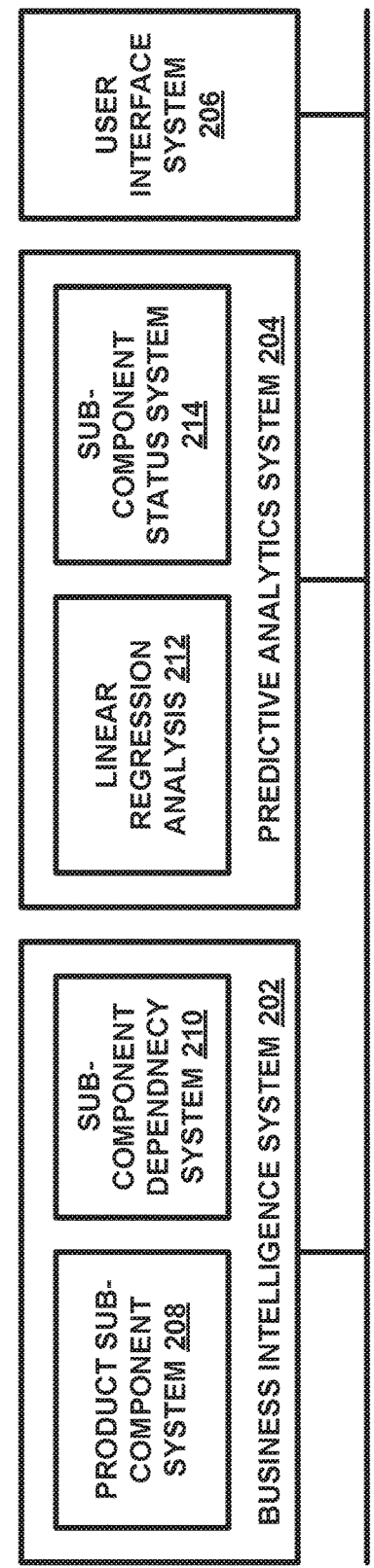
FIG. 2 is a diagram of a system for providing business intelligence and predictive analytics for manufacturing and related activities, in accordance with an exemplary embodiment of the present disclosure.

FIG. 2 is a diagram of a system 200 for providing business intelligence and predictive analytics for manufacturing and related activities, in accordance with an exemplary embodiment of the present disclosure. System 200 includes business intelligence system 202, predictive analytics system 204, user interface 206, product sub-component system 208, sub-component dependency system 210, linear regression analysis 212 and sub-component status system 214, each of which can be implemented in hardware or a suitable combination of hardware and software.

Business intelligence system 202 receives manufacturing data, status data and other suitable data and generates reports to identify development, manufacturing and delivery data. In one exemplary embodiment, business intelligence system 202 can receive product development data that identifies a system, system components, business entities associated with each system component such as development groups and vendors, deadlines associated with each system component such as testing dates, design approval dates and shipping dates, and other suitable data, and generates reports that present the status of the product development data. In this exemplary embodiment, business intelligence system 202 includes a plurality of reporting algorithms that generate reports from input data that identify the status of the product development process. In a similar manner, data that pertains to the manufacture of products, delivery of products, assembly of systems or other suitable processes can be processed by business intelligence rules that define these activities, to generate reports for use in management or for other suitable purposes.

Predictive analytics system 204 receives data associated with business intelligence rule reports and performs analysis on the data to identify trends pertaining to associated manpower resources, physical resources or other variables. In one exemplary embodiment, predictive analytics system 204 can project a date on which a number of defects will reach a peak, to allow resources required to resolve defects to be allocated.

User interface 206 generates graphic controls to allow a user to select reports, to enter data, to create new business intelligence rules, to perform predictive analysis and for other suitable purposes. In one exemplary embodiment, user interface 206 can include associated graphic controls for business intelligence system 202, predictive analytics system 204, product sub-component system 208, sub-component dependency system 210, linear regression analysis 212 and sub-component status system 214, to allow a user to interface with each system by providing data, selecting algorithms, entering algorithms or for other suitable purposes.

Product sub-component system 208 creates a data structure for a product to define the product using a plurality of sub-components. In one exemplary embodiment, a product such as a server can be defined by groups such as a display, a processor group, a network communications group, a data storage group and so forth, to allow responsibility for the design and manufacturing of individual subcomponents of the server to be identified. Additional information and rules for each sub-component can be identified, such as vendors, lead times, costs, manpower and the like. Product sub-component system 208 relates each sub-component of the product to the other sub-components of the product, to allow reports to be generated that display outstanding issues for each sub-component. In one exemplary embodiment, a report can be generated that shows the total number of identified defects for each subcomponent in relation to the total number of identified defects for every subcomponent, such as by generating a single bar chart showing the number of defects for each subcomponent, multiple adjacent bar charts showing the number of defects for each subcomponent, a histogram chart showing the number of defects for each subcomponent, a pie chart showing the number of defects for each subcomponent, an area chart showing the number of defects for each subcomponent, a waterfall chart showing the number of defects for each subcomponent, a gap chart showing the number of defects for each subcomponent, a candlestick chart showing the number of defects for each subcomponent or other suitable displays. A similar display can be generated for a number of issues, a number of work orders, a number of man hours, a number of days, a number of units or other suitable metrics. By presenting the number of metrics for sub-components in a single view, the sub-components that require the greatest allotment of resources can be readily identified, to allow corrective actions to be taken.

Sub-component dependency system 210 maps identified subcomponent dependencies and allows newly discovered sub-component identities to be created, so as to incorporate new business intelligence into an existing business intelligence data set for a product. In one exemplary embodiment, defects for a first component that have a relationship to defects for additional components can be identified, so as to allow for workload planning for defect resolution. In this exemplary embodiment, the first component can be a cooling fan, and the second component can be a semiconductor element such as a processor that is cooled by the cooling fan, where failures due to defects in the cooling fan will cascade to failures in the cooled component. The failure can be a failure of the cooling fan to provide a design level of cooling, such as due to an obstruction, a load response curve, an overheating protection response, or other identified defects. Once these defects have been identified, a dependency can be created to identify the issue for subsequent analysis, such as testing to determine whether the defect will have an impact on the cooled component, design modifications to compensate for the defect and the like.

Linear regression analysis 212 performs linear regression on data sets for products, components, systems or similar items, for use in analyzing data for similar products, components, systems or items. In one exemplary embodiment, a server product can be related to previous server products, and the historical number of identified defects, issues or other items for the components and sub-components for earlier server products can be used to determine expected defect identification patterns for the current server product. In this exemplary embodiment, linear regression analysis can be used to evaluate defect identification and resolution rates for sub-components, relationships between defect identification and relationship rates between sub-components and other historical relationship data, and the identified historical relationships can be applied to a new product.

Sub-component status system 214 receives status data for defects, issues, action items, a number of items in production, a number of items by production stage, a number of man hours or other suitable data and generates user-selectable reports, such as to show the number of defects for different components, the number of issues as a function of the number of items by production stage, and so forth. In this manner, business intelligence that is developed for analyzing the status of product development, manufacturing and delivery can be saved and used for different products, different production stages or in other suitable manners.

Figure 3:
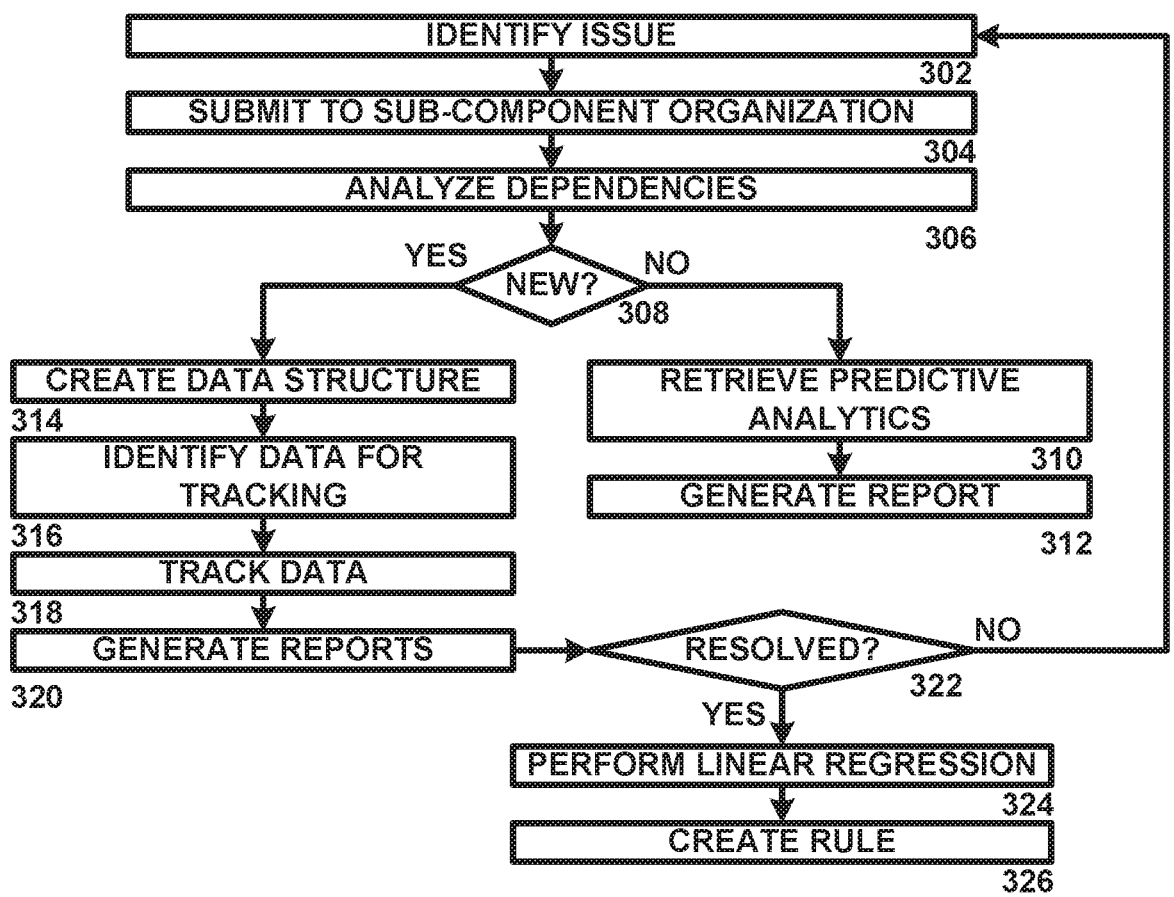
FIG. 3 is a diagram of an algorithm for creating business intelligence, in accordance with an exemplary embodiment of the present disclosure.

FIG. 3 is a diagram of an algorithm 300 for creating business intelligence, in accordance with an exemplary embodiment of the present disclosure. Algorithm 300 can be implemented in hardware or a suitable combination of hardware and software.

Algorithm 300 begins at 302, where an issue is identified. In one exemplary embodiment, a user interface can be generated that allows a user to enter data that is needed to identify the issue, such as a user identifier, contact information, a project identifier, a component identifier, a sub-component identifier, a defect description field, an issue description field or other suitable fields. An additional process can be implemented to confirm that all necessary fields have been provided. The algorithm then proceeds to 304.

At 304, the issue is submitted to a sub-component organization for analysis. In one exemplary embodiment, algorithm 300 can include a number of user identifiers and associate contact addresses for users associated with each project, each component, each sub-component, each defect, each issue or other suitable fields, and information can be provided for those users related to the new issue. The algorithm then proceeds to 306.

At 306, dependencies are analyzed. In one exemplary embodiment, the dependencies can be between the sub-component and other sub-components, between the defect and other defects, between the sub-component and other defects and so forth. The algorithm then proceeds to 308.

At 308, it is determined whether the issue is new. If the issue has previously been analyzed, such as for an earlier product, the algorithm proceeds to 310, where predictive analytics are retrieved. In one exemplary embodiment, the predictive analytics can identify corrective actions, manpower allocations, associated sub-components and other items that need to be addressed to resolve the issue. The algorithm then proceeds to 312, where a report is generated.

If it is determined that the issue is new at 308, the algorithm proceeds to 314, where a data structure is created for the issue. In one exemplary embodiment, the data structure can include identification of a responsible analyst, deadlines for resolution, severity levels, dependencies to other sub-components and other suitable data. The algorithm then proceeds to 316.

At 316, data required for tracking is identified. In one exemplary embodiment, sub-component testing, test programs, manpower allocation, time spent, development or delivery deadlines or other suitable data can be identified, to allow the status of the issue resolution to be determined and reported. The algorithm then proceeds to 318, where the data is tracked, such as during testing and evaluation of the problem. The algorithm then proceeds to 320.

At 320, reports are generated to allow the reviewers to determine whether the issue has been resolved. In one exemplary embodiment, the reports can be automatically generated, but the reports can also or alternatively be generated on demand or in other suitable manners. The algorithm then proceeds to 322, where it is determined whether the issue has been resolved. If the issue has not been resolved, the algorithm returns to 302, otherwise, the algorithm proceeds to 324.

At 324, a linear regression is performed to generate predictive analytics for future use. In one exemplary embodiment, the linear regression can be used to predict when a peak number of defects will be identified, the relationship between the identified defect and other components or other suitable data. For example, a total number of reported defects on each of a plurality of dates can be received, and can be used to generate an algorithmic relationship through linear regression that returns an expected value for a total number of defects as a function of a date, such as a number of days into a design cycle, a number of days into a manufacturing cycle, a number of days into a product test cycle and the like. The linear regression can utilize an ordinary least squares linear regression, a generalized least squares linear regression, a percentage least squares linear regression, an iteratively-weighted least squares linear progression, a total least squares linear regression or other suitable techniques that product an algorithmic relationship between a date and a total number of defects, issues or other items that require workforce hours for resolution. In this manner, the number of workforce hours required to address the expected number of defects, issues or other items can be predicted to allow workload planning to be performed. The algorithm then proceeds to 326 where a rule is created for applying the predictive analytics to future data.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for project status management in a manufacturing process comprising:
   creating a manufacturing issue identification data structure for a manufacturing issue associated with a sub-component defect of a plurality of sub-components of a product in a non-transitory memory device using a processor, wherein the sub-component defect results in a decrease of a number of acceptable products;
   generating a notification control to an analyst using the processor to enable the analyst to activate the control to process the issue identification data structure;
   creating one or more sub-component dependencies in the issue identification data structure using the processor in response to data received from a user interface to associate the sub-component defect to one or more related components;
   receiving issue resolution data associated with the issue identification data structure at the processor, wherein the issue resolution data includes the one or more related components;
   creating a new predictive analytical algorithm using the processor that uses a sub-component defect rate and a related component failure rate to predict a date on which the decrease in the number of acceptable products will reach zero by generating a user interface control configured to receive a total number of outstanding defects for each of a plurality of dates and associating the user interface with an algorithm that applies a linear regression to generate a user display that includes a predicted date on which the total number of outstanding defects will reach a peak and an identification of one or more resources that can be allocated to reduce the peak; and
   associating the predictive analytical algorithm with the issue identification data structure using the processor.

2. The method of claim 1 further comprising:
   determining whether a stored predictive analytical algorithm in a library of predictive analytical algorithms is associated with the issue identification data structure for a hardware component design using the processor; and
   applying the stored predictive analytical algorithm from the library of predictive analytical algorithms before creating the predictive analytical algorithm using the processor for the hardware component design if the stored predictive analytical algorithm is associated with the issue identification data structure.

3. The method of claim 1 wherein creating the issue identification data structure comprises creating a defect notification for a new defect of a hardware component design in combination with a notification of a total number of defects for the hardware component design and a notification for an associated component failure rate.

4. The method of claim 1 wherein creating the issue identification data structure comprises creating a defect notification associated with product as a function of a number of defects of the product in combination with a graphic showing a total number of defects for the hardware component design Previously Presented.

5. The method of claim 1 wherein creating the issue identification data structure comprises creating a defect notification associated with a sub-component of a product in combination with a notification of a total number of defects for the sub-component and a notification for an organization associated with a similar sub-component.

6. The method of claim 1 wherein generating the notification to the analyst comprises determining an identification of the analyst as a function of a defect type of a component of a hardware system and generation of a user interface control to enable the analyst to invoke a return assignment process.

7. The method of claim 1 wherein generating the notification to the analyst comprises determining an identification of the analyst as a function of a component of a product and a component of an earlier product and generation of a user interface control to enable the analyst to create a proposed disposition.

8. The method of claim 1 wherein generating the notification to the analyst comprises determining an identification of the analyst as a function of a sub-component of a product of a system and the analyst's prior experience with that sub-component and generation of a user-interface control to enable the analyst to move an issue to a review stage.

9. The method of claim 1 wherein using the processor to process the issue identification data structure comprises modifying a component status associated with the issue identification data structure to identify a process stage associated with the component and generating a user interface control to allow a user to modify one or more data fields responsive to the modification.

10. The method of claim 9 wherein identifying the process stage consists of generating a control to invoke an algorithm to implement one of a submit stage, an analyze stage, a review stage and a verify stage of a product defect of a component of a system and generating a user interface control to allow a user to modify one or more data fields responsive to the implementation.

11. The method of claim 10 wherein creating the sub-component dependencies in the issue identification data structure using the processor comprises creating a defect failure association between a first sub-component of a current system and a second sub-component of a prior system as a function of a failure mode of the first sub-component and a relationship of the failure mode to one or more associated sub-components.

12. The method of claim 1 wherein creating the new predictive analytical algorithm using the processor comprises performing a linear regression on a defect frequency data and associated defect resolution data for a hardware defect of a system.

13. The method of claim 12 wherein performing the linear regression on the defect frequency data comprises identifying a total number of outstanding defects on each of a plurality of dates for an earlier version of a hardware system and associated defect identification data.

14. The method of claim 12 wherein performing a linear regression on a defect frequency rate comprises:
identifying a total number of outstanding defects of a component of a system on each of a plurality of dates; and
performing a linear regression on the total number of outstanding defects of the component of the system to identify a date on which the total number of outstanding defects will equal zero and generating a notification of the date.

15. The method of claim 1 wherein creating the new predictive analytical algorithm comprises multiplying a peak number of total outstanding defects of a sub-component of a system by a manpower factor to determine an estimated manpower requirement to resolve the peak number of total outstanding defects and generating a user interface display that includes the peak number of total outstanding defects.

16. A method for project status management comprising:
creating a manufacturing issue identification data structure associated with a hardware component in a hardware system in a non-transitory memory device using a processor;
generating a notification control to an analyst using the processor to enable the analyst to activate the control to process the issue identification data structure, as a function of a pre-existing relationship between a related hardware component in a related hardware system;
creating one or more sub-component dependencies for hardware sub-components of the hardware component in the issue identification data structure in response to data received from a user interface using the processor as a function of one or more related sub-component dependencies for related hardware sub-components of the related hardware component;
receiving issue resolution data associated with the issue identification data structure at the processor;
creating a new predictive analytical algorithm using the processor as a function of the related sub-component dependencies for the related hardware sub-components of the related hardware component by generating a user interface control configured to receive a total number of outstanding defects for each of a plurality of dates and associating the user interface with an algorithm that applies a linear regression to generate a user display that includes a predicted date on which the total number of outstanding defects will reach a peak and an identification of one or more resources that can be allocated to reduce the peak; and
associating the new predictive analytical algorithm with the issue identification data structure for the hardware component using the processor.

17. A method for project status management comprising:
creating a manufacturing issue identification data structure associated with a hardware component in a server in a non-transitory memory device using a processor;
generating a notification control to an analyst using the processor to enable the analyst to activate the control to process the issue identification data structure, as a function of a pre-existing relationship with a related hardware component in a related server;
creating one or more sub-component dependencies for hardware sub-components of the hardware component in the issue identification data structure in response to data received from a user interface using the processor as a function of one or more related sub-component dependencies for related hardware sub-components of the related hardware component;
receiving issue resolution data associated with the issue identification data structure at the processor;
creating a new business intelligence rule using the processor as a function of the related sub-component dependencies for the related hardware sub-components of the related hardware component by generating a user interface control configured to receive a total number of outstanding defects for each of a plurality of dates and associating the user interface with an algorithm that applies a linear regression to generate a user display that includes a predicted date on which the total number of outstanding defects will reach a peak and an identification of one or more resources that can be allocated to reduce the peak; and
associating the new business intelligence rule with the issue identification data structure for the hardware component using the processor.

18. The method of claim 17 wherein the hardware component comprises one of a display group, a processor group, a network communications group and a data storage group and the related hardware component comprises the one of the display group, the processor group, the network communications group and the data storage group and the business intelligence rule comprises a predictive analytical algorithm.

19. The method of claim 18 wherein generating the notification to the analyst using the processor to process the issue identification data structure, as the function of the pre-existing relationship with the related hardware component in the related server comprises generating the notification to the analyst in a processor group using the processor to process the issue identification data structure, as the function of the pre-existing relationship with the related hardware component in the related server for a data storage group.

* * * * *